US011453170B2

(12) United States Patent
Carbone et al.

(10) Patent No.: US 11,453,170 B2
(45) Date of Patent: Sep. 27, 2022

(54) DISTRIBUTION OF CUSTOMIZED ENGINEERING MODELS FOR ADDITIVE MANUFACTURING

(71) Applicant: General Electric Company, Schenectady, NY (US)

(72) Inventors: John William Carbone, Niskayuna, NY (US); Benjamin Edward Beckmann, Niskayuna, NY (US); Joseph Salvo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 16/641,167

(22) PCT Filed: Aug. 31, 2017

(86) PCT No.: PCT/US2017/049677
§ 371 (c)(1),
(2) Date: Feb. 21, 2020

(87) PCT Pub. No.: WO2019/045735
PCT Pub. Date: Mar. 7, 2019

(65) Prior Publication Data
US 2021/0086451 A1 Mar. 25, 2021

(51) Int. Cl.
*B29C 64/393* (2017.01)
*B33Y 10/00* (2015.01)
(Continued)

(52) U.S. Cl.
CPC ............ *B29C 64/393* (2017.08); *B33Y 10/00* (2014.12); *B33Y 50/02* (2014.12); *B33Y 80/00* (2014.12); *G06F 30/12* (2020.01); *G06F 30/17* (2020.01)

(58) Field of Classification Search
CPC .................................................. B29C 64/393
(Continued)

(56) References Cited

U.S. PATENT DOCUMENTS 3,632,989 A  1/1972  Kasischke
4,901,218 A  2/1990  Cornwell
(Continued)

FOREIGN PATENT DOCUMENTS

CN  105144167 A  12/2015
CN  105637512 A  6/2016
(Continued)

OTHER PUBLICATIONS

Catalan, Carlos, et al.; "COSME: A distributed control platform for communicating machine tools in Agile Manufacturing Systems", Emerging Technologies & Factory Automation (ETFA), 2011 IEEE 16th Conference on, pp. 1-8, 2011, Toulouse, France.
(Continued)

*Primary Examiner* — Suresh Suryawanshi
(74) *Attorney, Agent, or Firm* — Fletcher Yoder, P.C.

(57) ABSTRACT

According to some embodiments, a system may include an additive manufacturing platform that provides additive manufacturing capability data (e.g., a printer model number, a printer resolution, etc.) to a model customization platform. The model customization platform may receive the additive manufacturing printer capability data and retrieve, from an additive manufacturing model data database, a primary engineering model associated with an industrial asset item. The model customization platform may then create a customized version of the primary engineering model in accordance with the additive manufacturing printer capability data and the primary engineering model. The customized
(Continued)

engineering model can then be transmitted to the additive manufacturing platform (e.g., to be printed to create the industrial asset item).

24 Claims, 14 Drawing Sheets

(51) Int. Cl.
    *B33Y 50/02* (2015.01)
    *B33Y 80/00* (2015.01)
    *G06F 30/12* (2020.01)
    *G06F 30/17* (2020.01)

(58) Field of Classification Search
    USPC .......................................................... 700/98
    See application file for complete search history.

(56) References Cited

U.S. PATENT DOCUMENTS

| | | |
|---|---|---|
| 7,010,384 B2 | 3/2006 | Lindstrom et al. |
| 8,515,826 B2 | 8/2013 | Norman |
| 8,818,543 B2 | 8/2014 | Sohmshetty et al. |
| 9,060,437 B2 | 6/2015 | Bloom et al. |
| 9,102,060 B2 | 8/2015 | Tarragona et al. |
| 9,604,412 B2 | 3/2017 | Donaldson et al. |
| 10,031,350 B2 | 7/2018 | Fonte et al. |
| 10,307,961 B2 * | 6/2019 | Rezayat .................. B28B 1/001 |
| 10,635,756 B2 | 4/2020 | Blanchfield et al. |
| 10,953,602 B2 | 3/2021 | Cluckers et al. |
| 2013/0329258 A1 * | 12/2013 | Pettis .................... F16M 11/18 358/1.15 |
| 2014/0309765 A1 | 10/2014 | Blanchfield, Jr. |
| 2014/0336808 A1 * | 11/2014 | Taylor .................. B29C 64/393 700/98 |
| 2015/0120806 A1 | 4/2015 | Lippincott |
| 2016/0054726 A1 * | 2/2016 | Yoo .................... G05B 19/4099 700/118 |
| 2016/0185044 A1 * | 6/2016 | Leonard ................. G06F 30/00 700/98 |
| 2016/0350749 A1 | 12/2016 | Wilkins et al. |
| 2017/0016244 A1 | 1/2017 | Keller et al. |
| 2017/0068238 A1 | 3/2017 | High et al. |
| 2017/0157859 A1 | 6/2017 | Mahdavi et al. |
| 2017/0173889 A1 * | 6/2017 | Thomas-Lepore .... B33Y 50/00 |
| 2017/0180307 A1 | 6/2017 | Shanks et al. |
| 2018/0069899 A1 * | 3/2018 | Lang ........................ G06F 8/38 |
| 2018/0099496 A1 * | 4/2018 | Morovic ................. G06T 17/00 |
| 2021/0256580 A1 * | 8/2021 | Norman ............. G06Q 30/0621 |

FOREIGN PATENT DOCUMENTS

| | | |
|---|---|---|
| CN | 105946223 A | 9/2016 |
| CN | 107004037 A | 8/2017 |
| EP | 1369758 A1 | 12/2003 |
| JP | 2007528240 A | 10/2007 |
| JP | 2012101443 A | 5/2012 |
| JP | 201704586 A | 6/2017 |
| WO | 2017136643 A1 | 8/2017 |

OTHER PUBLICATIONS

Lu, Xiaohu, et al.; "Design and implementation of machine tools supervisory system based on information model", Information and Automation (ICIA), 2014 IEEE International Conference on, pp. 856-859, 2014, Hailar, China.

International Search Report/Written Opinion, PCT/US17/49677 dated Nov. 9, 2017; 12 pages.

Application No. 201780094410.9; CN Office Action dated Jul. 20, 2021; 11 pages.

* cited by examiner

DISTRIBUTION OF CUSTOMIZED ENGINEERING MODELS FOR ADDITIVE MANUFACTURING

BACKGROUND

Some embodiments disclosed herein relate to industrial assets and, more particularly, to the distribution of customized engineering models to facilitate additive manufacture of industrial asset items.

An entity might want to obtain a three-dimensional industrial asset item, such as a nozzle for a jet engine, a replacement part for a wind turbine, or another three-dimensional industrial asset item. In some cases, an entity might have the part created by one of a number of different additive manufacturing platforms. For example, an additive manufacturing platform might receive an item definition file (associated with an engineering model) that can be used to print the three-dimensional item. Note that different additive manufacturing platforms might have different item creation capabilities. For example, different platforms might utilize different three-dimensional printers, with different printing resolutions, different powders, etc. Moreover, the different item creation capabilities might require or benefit from different item definition files and/or different engineering models. Creating item definition files and/or engineering models for all possible additive manufacturing situations, however, may be impractical. Such problems can be especially difficult when there are a relatively large number of potential customer, items, and/or additive manufacturing platforms. It would therefore be desirable to provide systems and methods to efficiently and accurately facilitate creation of an industrial asset item.

SUMMARY

According to some embodiments, a system may include an additive manufacturing platform that provides additive manufacturing capability data (e.g., a printer model number, a printer resolution, etc.) to a model customization platform. The model customization platform may receive the additive manufacturing printer capability data and retrieve, from an additive manufacturing model data database, a primary engineering model associated with an industrial asset item. The model customization platform may then create a customized version of the primary engineering model in accordance with the additive manufacturing printer capability data and the primary engineering model. The customized engineering model can then be transmitted to the additive manufacturing platform (e.g., to be printed to create the industrial asset item).

Some embodiments comprise: means for receiving, at a model customization platform from an additive manufacturing platform, additive manufacturing printer capability data; means for retrieving, by the model customization platform from an additive manufacturing model data database, a primary engineering model associated with the industrial asset item; means for creating a customized version of the primary engineering model in accordance with the additive manufacturing printer capability data and the primary engineering model; and means for transmitting the customized engineering model to the additive manufacturing platform.

Technical effects of some embodiments of the invention are improved and computerized ways to efficiently and accurately facilitate creation of an industrial asset item. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
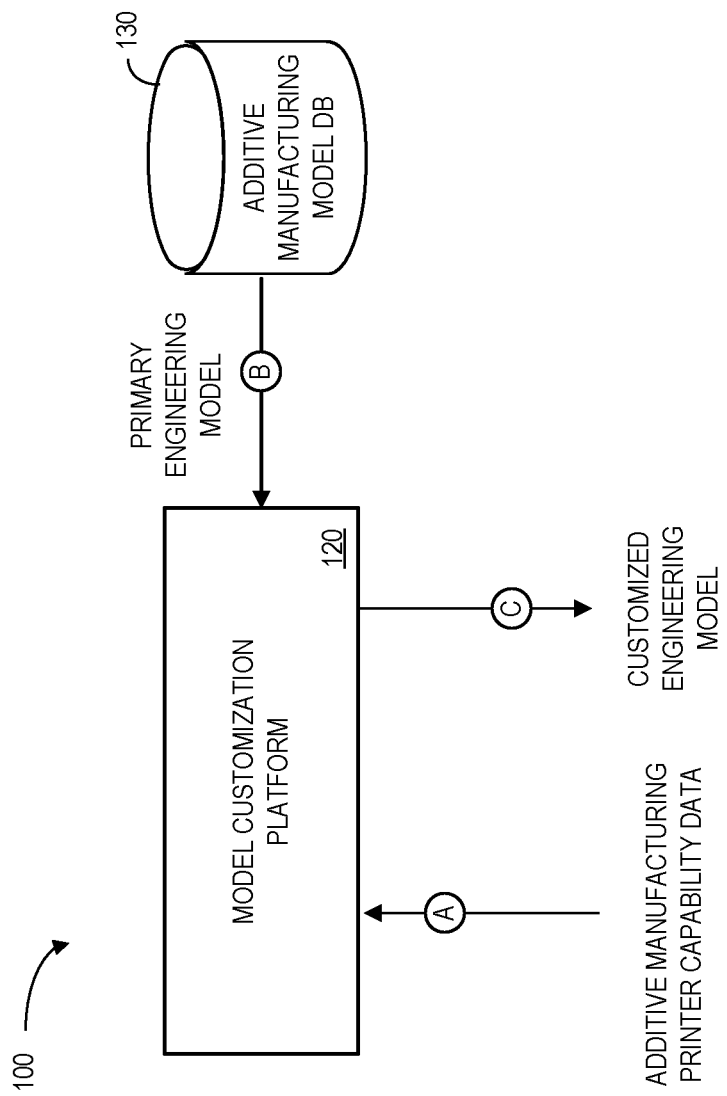
FIG. 1 is a high-level block diagram of a system according to some embodiments.

It may generally be desirable to efficiently and accurately facilitate creation of an industrial asset item. FIG. 1 is a high-level block diagram of a system 100 according to some embodiments. In particular, the system 100 includes a model customization platform 120 with a communication port to exchange information (e.g., with a number of different remote three-dimensional printers and/or printing platforms). According to some embodiments, the model customization platform 120 receives additive manufacturing printer capability data and retrieves a primary engineering model from an additive manufacturing model database 130 (e.g., storing item definition files associated with various industrial asset items). The model customization platform 120 and/or other elements may then create and output a customized engineering model. Note that the model customization platform 120 could be completely de-centralized and/or might be associated with a third party, such as a vendor that performs a service for an enterprise.

The model customization platform 120 might be, for example, associated with a Personal Computer ("PC"), laptop computer, a tablet computer, a smartphone, an enterprise server, a server farm, a digital transaction engine, and/or a database or similar storage devices. According to some embodiments, an "automated" model customization platform 120 may automatically create the customized engineering model. As used herein, the term "automated" may refer to, for example, actions that can be performed with little (or no) intervention by a human.

As used herein, devices, including those associated with the model customization platform 120 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The model customization platform 120 may store information into and/or retrieve information from data stores (e.g., the additive manufacturing model database 130 and/or other data stores). The data stores might, for example, store electronic records representing engineering models, prior transactions, transactions currently in process, etc. The data stores may be locally stored or reside remote from the model customization platform 120. Although a single model customization platform 120 is shown in FIG. 1, any number of such devices may be included. Moreover, various devices described herein might be combined according to embodiments of the present invention. For example, in some embodiments, the model customization platform 120, additive manufacturing database, and/or other devices might be co-located and/or may comprise a single apparatus.

In this way, the system 100 may efficiently and accurately facilitate creation of an industrial asset item. For example, at (A) the model customization platform 120 may receive additive manufacturing capability data from an additive manufacturing platform (e.g., including a build envelope, resolution, laser power value, etc.). At (B), the model customization platform 120 may retrieve a primary engineering model defining an industrial asset item from the additive manufacturing database 130. The model customization platform 120 can then create an appropriately customized engineering model for that particular three-dimensional printer and transmit the customized model at (C). The customized engineering model can then be used to print the industrial asset item. As a result, the system 100 may distribute engineering models and data packages for manufacture using various manufacturing technologies, and these engineering models may be customized to suit a manufacturer's specific manufacturing equipment.

Figure 2:
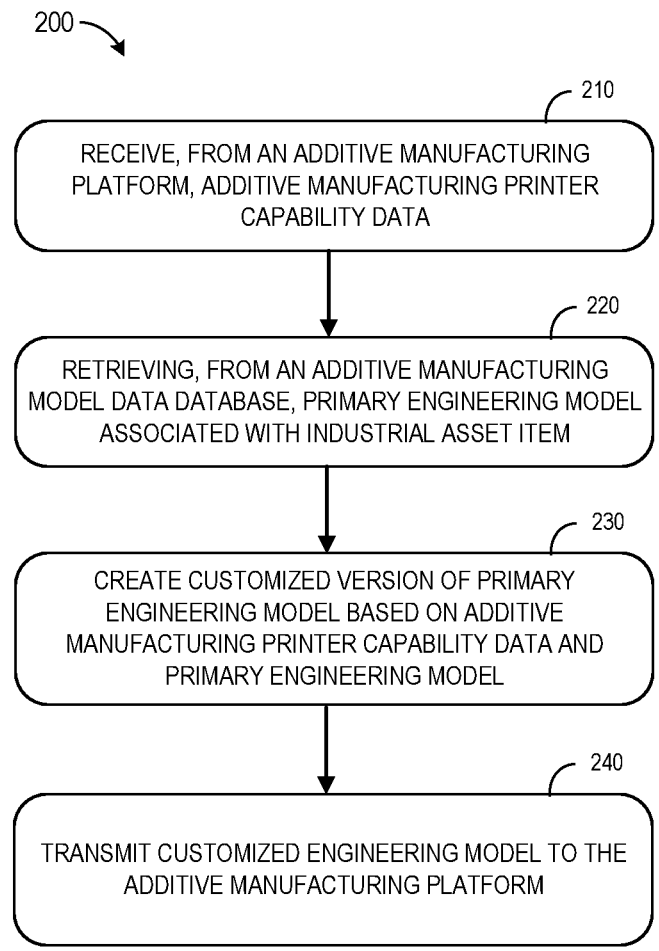
FIG. 2 is a method that may be associated with model customization platform in accordance with some embodiments.

Note that the system 100 of FIG. 1 is provided only as an example, and embodiments may be associated with additional elements or components. According to some embodiments, the elements of the system 100 automatically facilitate creation of an industrial asset item for a customer. For example, FIG. 2 illustrates a method 200 that might be performed by the model customization platform 120 and/or other elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, a model customization platform may receive additive manufacturing printer capability data (e.g., from an additive manufacturing platform). According to some embodiments, the additive manufacturing platform utilizes an additive manufacturing printer associated with three-dimensional printing. In this case, the capability data might be associated with an additive manufacturing printing technique, a printer manufacturer, a printer model, a software version associated with a printer, etc. As used herein, the phrase "additive manufacturing" may refer to various types of three-dimensional printing, including, for example, those described in the American Society for Testing and Materials ("ASTM") group "ASTM F42—Additive Manufacturing" standards. These may include (but are not limited to) vat photopolymerisation (using a vat of liquid photopolymer resin), material jetting (where material is jetted onto a build platform), binder jetting (e.g., using a powder based material and a binder), material extrusion such as Fuse Deposition Modelling ("FDM"), powder bed fusion (e.g., Direct Metal Laser Sintering ("DMLS"), Electron Beam Melting ("EBM"), etc.), a sheet lamination (including Ultrasonic Additive Manufacturing ("UAM") and Laminated Object Manufacturing ("LOM")), Directed Energy Deposition ("DED"); or the like.

Note that the additive manufacturing printer capability might be associated with many different types of data. For example, printer "resolution" may describe layer thickness and X-Y resolution in dots-per-inch ("dpi") or micrometers ("μm"). Typical layer thickness might be around 100 μm (250 dpi) but some printers can create layers 16 μm (1,600 dpi) or less. As a result, the additive manufacturing printer capability might be associated with a resolution, a layer thickness, an X-Y resolution, a dpi value, μm value, a build envelope (e.g., defining the dimensions of the largest item that can be created by a printer), etc.

According to some embodiments, the additive manufacturing printer capability might be associated with data about a particular printer part or component, such as an electron beam power, a laser power, a raw material used by a printer (e.g., a powder characteristic), a component capability, a laser type, a print nozzle type, a component speed, a component tolerance, etc. As other examples, the additive manufacturing printer capability might be associated with an environmental capability (e.g., a temperature or cleanliness value), an inspection capability, a geographic information (e.g., where export restrictions might limit the data included in an engineering model), etc.

At 220, the model customization platform may retrieve a primary engineering "model" associated with an industrial asset item from an additive manufacturing model database. For example, the primary engineering model might comprise an industrial asset file associated with a Computer Aided Design ("CAD") protocol defining a three-dimensional "industrial asset" part (e.g., a gear, a fuel nozzle, etc.). As used herein, the phrase "industrial asset" might be associated with, for example, an engine, an aircraft, a dam, a locomotive, power generation, a wind turbine, etc. As used herein, the term "model" may be associated with, for example a scan path, an Additive Manufacturing File ("AMF") format (e.g., as defined by the "Standard Specification for AMF Format," Version 1.2, created by International Organization for Standardization/American Society for Testing and Materials ("ISO/ASTM") XML-based standard 52915:2013), a Standard Tessellation Language file ("STL"), etc.

At 230, a customized version of the primary engineering model may be created in accordance with the additive manufacturing printer capability data and the primary engineering model. For example, the resolution of information in the customized model might be lowered as compared to the primary model in view a particular printer's limited abilities. At 240, the customized engineering model may be transmitted to the additive manufacturing platform. The additive manufacturing platform can then communicate with an additive manufacturing printer to create the industrial asset (e.g., which can then be delivered to a customer). According to some embodiments, the customized engineering model may instead be transmitted from the model customization platform to the three-dimensional printer.

Figure 3:
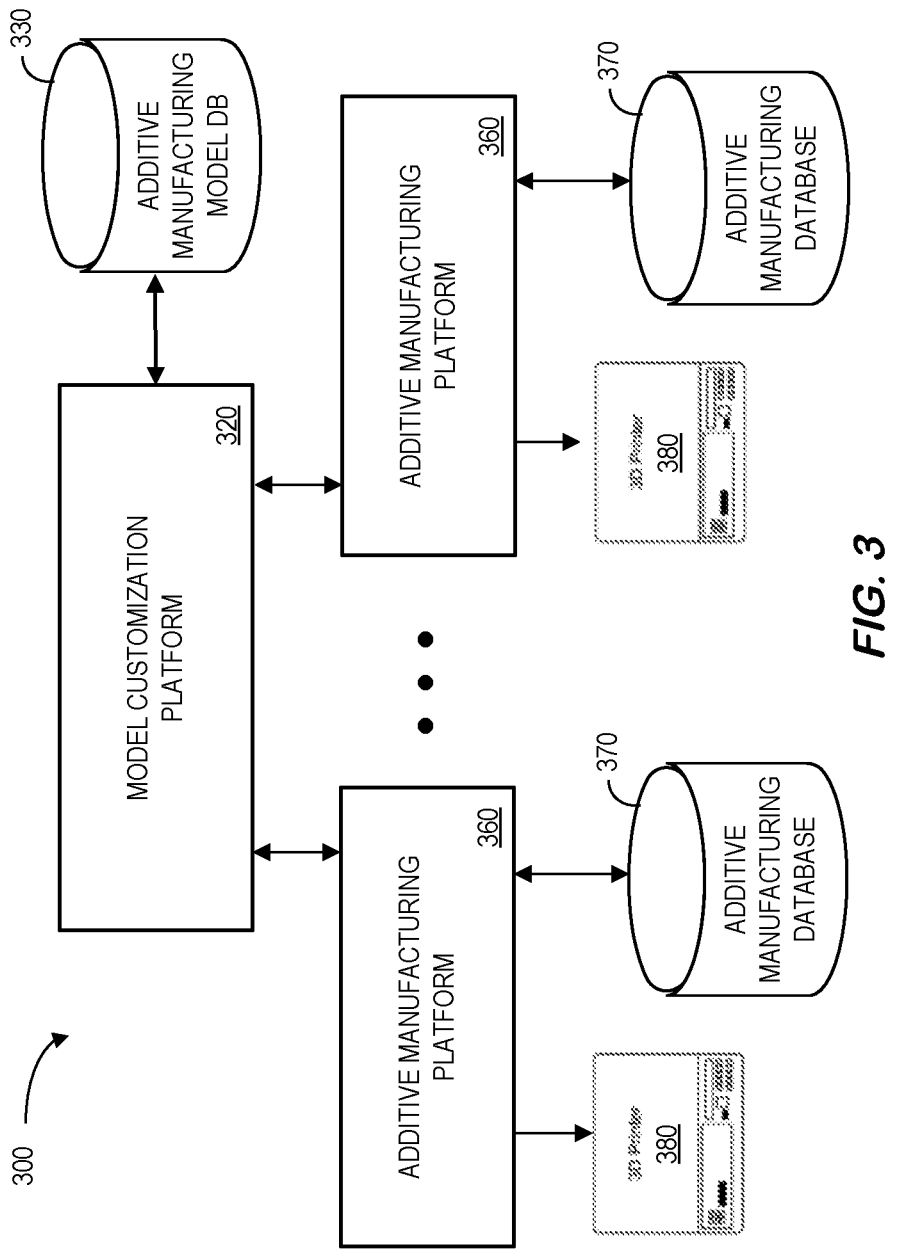
FIG. 3 is a high-level block diagram of a system including a model creation platform and additive manufacturing platforms according to some embodiments.

According to some embodiments, a model customization platform communicates with a plurality of additive manufacturing platforms (at least some of which have differing additive manufacturing capability data) and/or a plurality of customer platforms requesting different industrial asset items. Note that a model customization platform might be associated with a single network cloud-hosted topology, a multiple network cloud-hosted topology, and/or a participant hosted intranet environment. For example, FIG. 3 is a high-level block diagram of a system 300 including a model customization platform 320 and additive manufacturing platforms 360 according to some embodiments. As before, the model customization platform 320 may receive additive manufacturing printer capability data (in this case, from multiple additive manufacturing platforms 360 based on data locally stored at additive manufacturing databases 370) and retrieves a primary engineering model from an additive manufacturing model database 330 (e.g., storing item definition files associated with various industrial asset items). The model customization platform 320 and/or other elements may then create and output customized engineering models to the additive manufacturing platforms 360. The customized models can then be used to create industrial asset items via three-dimensional printers 380. Thus, the creation of a single, primary engineering model may depict an original engineering design intent. Based upon unique characteristics of distinct manufacturing equipment, multiple versions of engineering models (suitable to optimally manufacture on that equipment) may be created. This technique may allow for the economic creation and distribution of engineering models needed to manufacture industrial asset items in an advantageous manner.

Figure 4:
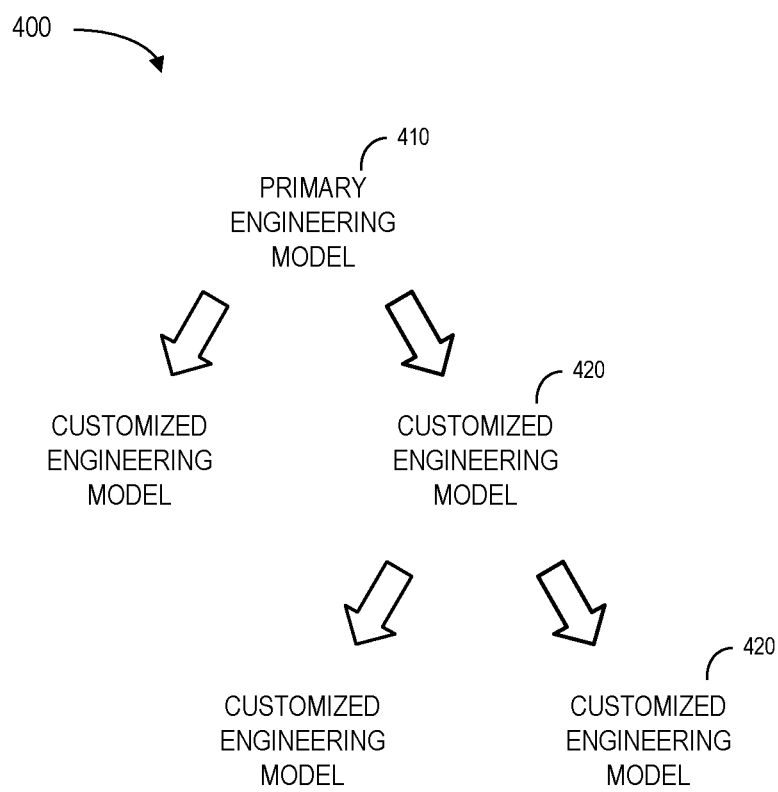
FIG. 4 illustrates a primary engineering model and associated customized engineering models in accordance with some embodiments.

FIG. 4 illustrates 400 a primary engineering model 410 and associated customized engineering models 420 in accordance with some embodiments. Note that a single primary engineering model 410 (e.g., representing an idealized version of an industrial asset model) may end up being associated with multiple customized engineering models 420 (e.g., each to be used by different three-dimensional printers having different capabilities). Moreover, a customized engineering model 420 might be generated from the primary engineering model 410 or, according to some embodiments, from another customized engineering model 420.

Thus, individuals or companies that may wish to procure engineering models for manufacture on their equipment may provide specific characteristics of their manufacturing equipment to facilitate the customization of engineering models 420. The specific characteristics may be provided, for example, electronically. The engineering models 420 required for manufacture components via a specified manufacturing process may be modified with knowledge of a procurer's specific equipment characteristics to create a tailored engineering model 420 (e.g., scan path) to be provided to the procurer.

Note that computer controlled manufacturing equipment is improving at a rapid pace. In order to optimally manufacture components using certain manufacturing processes, the requisite data files (e.g., engineering models, scan paths, etc.) may be tailored to suit the specific characteristics of specified manufacturing equipment. According to some embodiments, individuals or companies may want to procure engineering models to manufacture with their manufacturing equipment which may be of different configurations as compared to other individuals and companies. Some embodiments described herein may allow for the creation of tailored engineering models 420 suitable for specific types or configurations of equipment.

Figure 5:
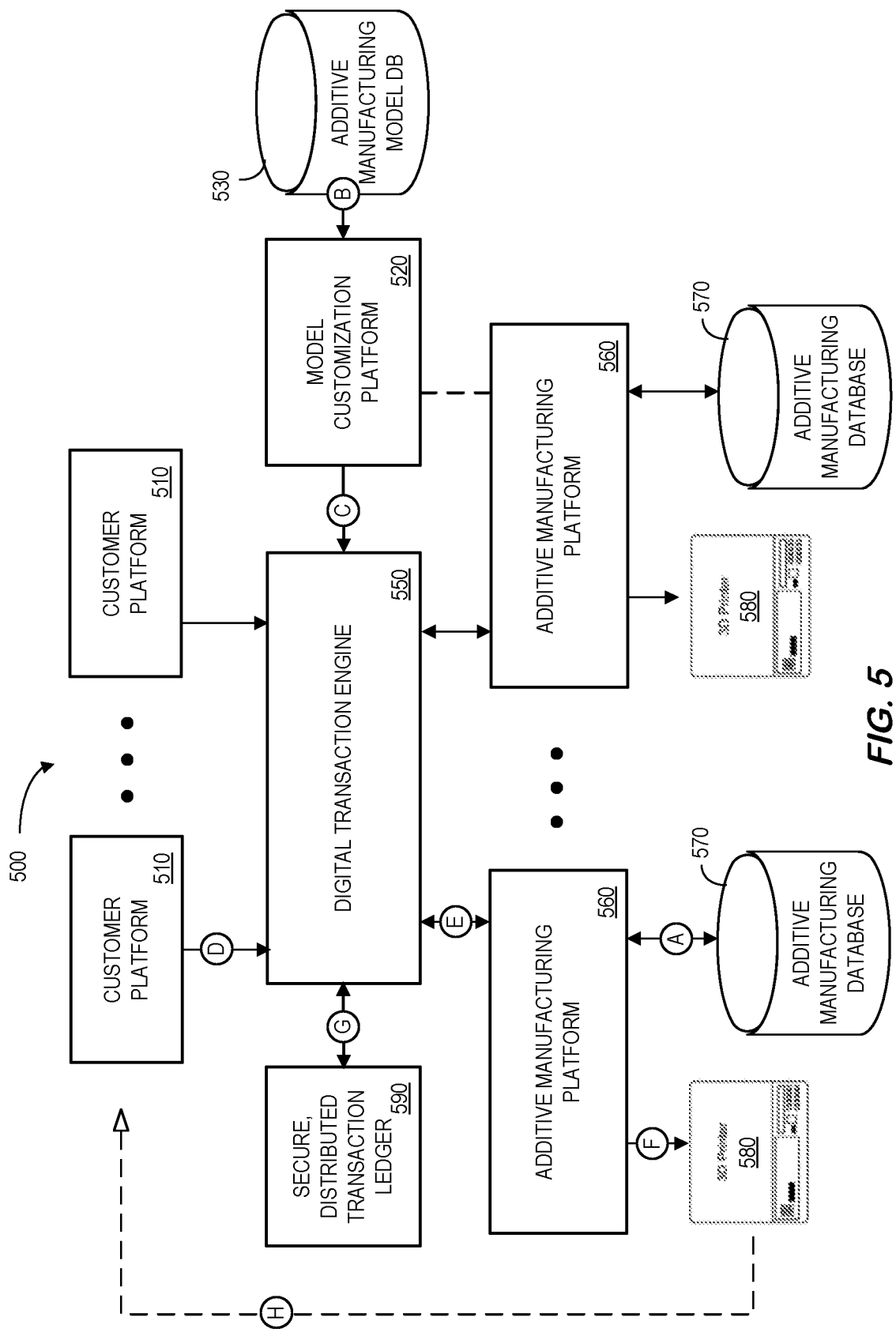
FIG. 5 is a block diagram of an additive digital ecosystem according to some embodiments.

FIG. 5 is a block diagram of an additive digital ecosystem 500 according to some embodiments. In particular, the additive digital ecosystem 500 includes a digital transaction engine 550 with a communication port to exchange information with a number of customer platforms 510. According to some embodiments, the digital transaction engine 550 receives an industrial asset item request from one of the customer platforms 510 and assigns the request to one of a number of additive manufacturing platforms 560. Each additive manufacturing platform 560 might include and/or be associated with an additive manufacturing database 570 (e.g., where the database 570 may store a printer version number, a maximum resolution of a printer, powder specifics, a minimum turnaround time for a newly received job, etc.) and a three-dimensional printer 580. According to some embodiments, a model customization platform 520 may retrieve a primary engineering model from an additive manufacturing model database 530, customize the model, and provide the customized model to the digital transaction engine 550 (or directly to an additive manufacturing platform 560 as illustrated by the dashed line in FIG. 5). The digital transaction engine 550 and/or other elements of the system may then record information about the transaction using a secure, distributed transaction ledger 590 (e.g., via a blockchain verification process). For example, the digital transaction engine 550 might record an order date and time, a customized engineering model identifier, a price, a bid, etc. via the secure, distributed transaction ledger 590 in accordance with any of the embodiments described herein. According to some embodiments, the distributed ledger might be associated with the HYPERLEDGER® blockchain verification system. Note that the digital transaction engine 550 could be completely de-centralized and/o might be associated with a third party, such as a vendor that performs a service for an enterprise.

The digital transaction engine 550, customer platform 510, model customization platform 520, and/or additive manufacturing platform 560 might be, for example, associated with a Personal Computer ("PC"), laptop computer, a tablet computer, a smartphone, an enterprise server, a server farm, and/or a database or similar storage devices. As used herein, devices, including those associated with the digital transaction engine 550 and any other device described herein, may exchange information via any communication network which may be one or more of a LAN, a MAN, a WAN, a proprietary network, a PSTN, a WAP network, a Bluetooth network, a wireless LAN network, and/or an IP network.

The digital transaction engine 550 may store information into and/or retrieve information from data stores. The data stores may, for example, store electronic records representing prior transactions, transactions currently in process, etc. The data stores may be locally stored or reside remote from the digital transaction engine 550. Although a single digital transaction engine 550 is shown in FIG. 5, any number of such devices may be included in the ecosystem 500. Moreover, various devices described herein might be combined according to embodiments of the present invention. For example, in some embodiments, the digital transaction engine 550, model customization platform 520, data stores, and/or other devices may be co-located and/or may comprise a single apparatus.

In this way, the additive digital ecosystem 500 may efficiently and accurately facilitate creation of an industrial asset item. For example, at (A) the additive manufacturing platform 560 may obtain additive manufacturing capability data from the additive manufacturing database 570 and provide that information to the digital transaction engine 550. At (B) the model customization platform 520 may retrieve a primary engineering model from the additive manufacturing model database 530, customize it based on the capability data, and provide the customized model to the digital transaction engine 550 at (C). At (D), the customer platform 510 may transmit an industrial asset item request to the digital transaction engine 550. The digital transaction engine 550 may then assign the request one of the additive manufacturing platforms 560 (e.g., by transmitting the customized engineering model to the platform 560 that was capable of producing the item at the lowest cost) at (E). The additive manufacturing platform 560 can then communicate with the three-dimensional printer 580 at (F) to initiate a printing process. Note that each step of the transaction may be recorded in the secure, distributed transaction ledger 590 at (G). When created, the completed item may be provided to the customer at (H) (as illustrated by the dashed arrow in FIG. 5).

Some embodiments might provide for transactions and/or digital payments for the digital transaction engine 550. This might provide the underlying structure of a digital ecosystem for the creation of industrial asset items. Some embodiments may further provide for smart contracts and/or brokerage payment and, in some cases, anonymity and/or other protections. For example, cryptocurrency might be used to create an opaque marketplace where identities are protected (as opposed to transparent marketplace). Finally, some embodiments may provide strong encryption for the precise control of advanced three-dimensional printing technologies, equipment, intellectual property, supply chain and pedigree histories, etc. As a result, counterfeit parts may be reduced and encrypted keys can be used to control access to equipment, build files, production volume and service contracts, etc. Moreover, the additive digital ecosystem 500 may be able to publish encrypted pedigree and transaction data to the distributed ledger 590 to help control knowledge flow from design, modeling, simulation, and manufacture through contractual services.

According to some embodiments, the digital transaction engine 550 may communicate with off-line optimization applications and real-time applications via a digital services marketplace and community. The digital transaction engine 550 might be associated with, for example, a content distribution and access management toolchain, system-level optimization, and/or multi-disciplinary optimization. The off-line optimization applications might include design applications, manufacturing planning applications, scan path generation applications, etc. The real-time applications might include, for example, machine controls, in-line inspection, factory visualization, etc. Note that the off-line optimization applications and/or real-time applications might support various item creation processes such as design, manufacturing planning, scan path generation, build, in-line inspection, part creation, post-process inspection, etc. In this way, the additive digital ecosystem 500 may provide improved outcomes (e.g., reducing the time needed for design changes to a day or less, a self-optimized build process, improved lifetime and/or performance of an individualized part, etc.).

Figure 6:
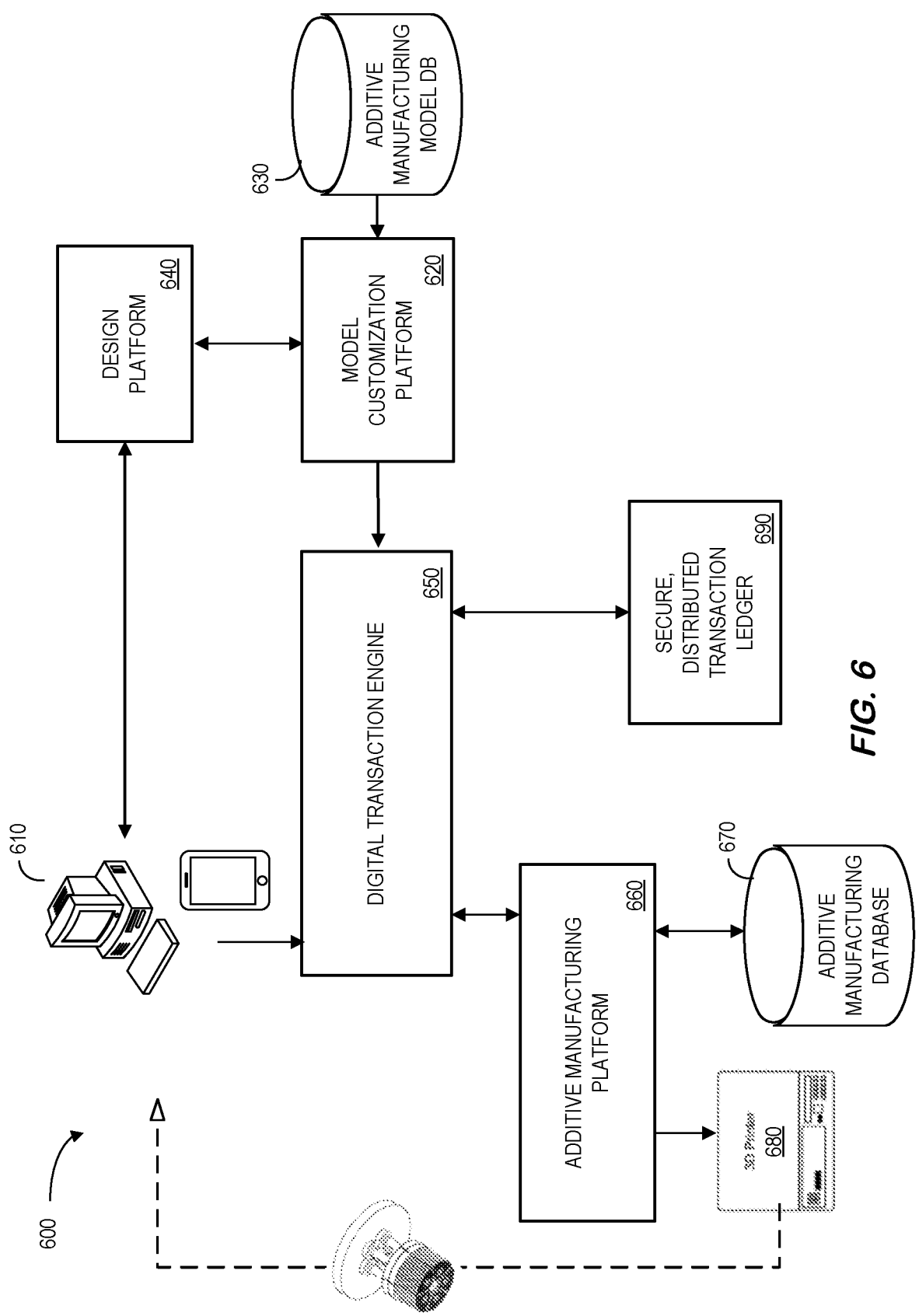
FIG. 6 is a high-level block diagram of a digital transaction system according to another embodiment.

FIG. 6 is a high-level block diagram of a digital transaction system 600 according to another embodiment. As before, a digital transaction engine 650 may receive an industrial asset item request from a customer platform 610. The digital transaction engine 650 may assign the request to an appropriate additive manufacture platform 660 having an additive manufacturing database 670 (e.g., a database 670 storing capability information), said database 670 which may be local to the platform 660, and a three-dimensional printer 680. The printer 680 may then create the item so that it can be provided to the customer who requested it. Some or all of these steps may be recorded in a secure, distributed transaction ledger 690 (e.g., blockchain technology). In this embodiment, a design platform 640 might work with the customer and/or a model customization platform 620 having a locally stored additive manufacturing model database 630 to create an appropriate primary engineering model for the item (e.g., an appropriate shape of the items, tools that need to be used to create the item, raw materials, etc.). According to some embodiments, the definition file may be encrypted and/or cryptographically signed and/or include pedigree data. Note that the design platform 640 and/or model customization platform 620 might create multiple designs and/ or definitions for a single item (e.g., different designs might be associated with different additive manufacturing processes, different printer models, etc.).

Figure 7:
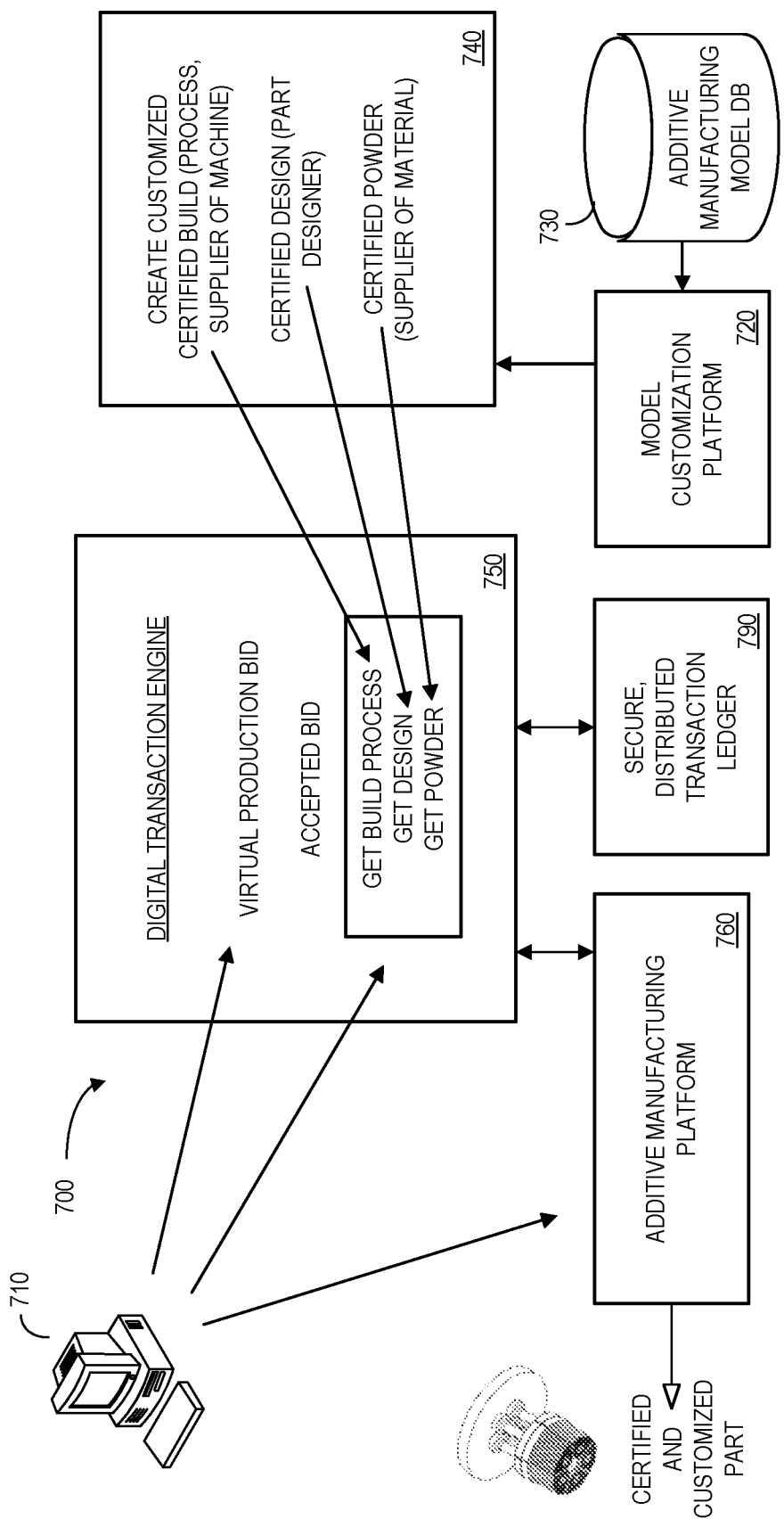
FIG. 7 is an additive part production chain enabled by a model customization platform in accordance with some embodiments.

FIG. 7 is an additive part production chain 700 enabled by a model customization platform in accordance with some embodiments. Again, a digital transaction engine 750 may receive an industrial asset item request from a customer platform 710. The digital transaction engine 750 may assign the request to an appropriate additive manufacture platform 760 to create the item so that it can be provided to the customer who requested it. Some or all of these steps might be recorded in a secure, distributed transaction ledger 790 (e.g., blockchain technology). Note that the customer might submit, by the customer platform 710, a "brokered buy" to the digital transaction engine 750 (which can then determine that a virtual production bid is accepted and used to initiate a build process, obtain the needed design, obtain required raw materials, etc.). In other embodiments, a customer might instead send a "direct buy" to the additive manufacturing platform 760. Moreover, in some embodiments, a design platform 740 may arrange for a customized, certified build (e.g., in connection with a model customization platform and locally stored additive manufacturing model database 730), a certified design, a certified powder, etc.

Thus, embodiments may facilitate distribution of intellectual property (e.g., engineering models and data packages for manufacture using additive manufacturing technology) facilitated by blockchain technology. Moreover, distributed ledger transactions may be used to effect and verify transactions between end users (e.g., customer, manufacturer, etc.) and seller/lessors of intellectual property (e.g., engineering models, technical data packages, processing conditions, inspection data, etc.) directly or through electronic intermediaries such as digital marketplaces. In addition, embodiments may provide a process for the distribution of customized engineering models through a single transaction (or series of transactions) via the use of blockchain distributed ledger technology. According to some embodiments, two or more parties may use the distributed ledger technology to record the economic exchange of information necessary for the manufacture of additive manufactured components. For each intermediate step in the exchange of technical information (e.g., including: quote, bid or award selection; manufacturing capability sharing; engineering model generation; engineering model distribution; additive raw material procurement, supply and readying; component manufacture; component inspection; component supply; and payment) a corresponding transaction may be created. These transactions might be published in part (or in whole) to the distributed ledger in un-encrypted or encrypted form as a means of providing an online pedigree of the manufactured component to interested parties.

For a number of different reasons (such as the spread of industrially relevant additive manufacturing printing hardware, the increasing specification of additive manufacturing process to manufacture components, etc.) it may become economically advantageous to make available digital files (containing intellectual property) for the manufacture of components, to end users that are not in-house or captive component suppliers. Therefore, it may be desirable to perform such transactions in a secure manner such that these digital engineering files and manufacturing process techniques remain secure. Creation of a digital ecosystem with strong encryption for the precise control of advanced three-dimensional printing technology, equipment, intellectual property, manufacturing, supply chain and pedigree histories based upon the use of blockchain technology may be provided in accordance with some embodiments described herein.

In order to protect the intellectual property required to manufacture components, requisite build files (e.g., customized engineering models, scan paths, etc.) and associated details (material specifications, lot data, machine specifications, process conditions, etc.) must be managed so as to secure the integrity of the data and limit theft (while still ensuring the production of high quality components using validated techniques). Finally, a validation mechanism may help verify authenticity of manufactured components while also protecting data rights.

Figure 8:
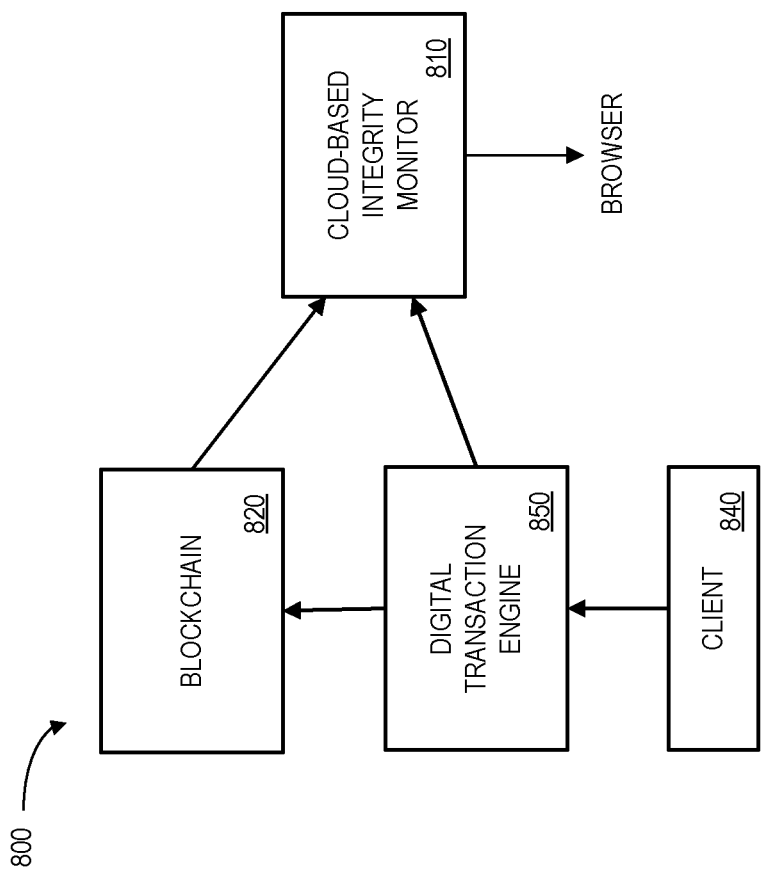
FIG. 8 is a system implementing a digital transaction with blockchain validation according to some embodiments.
Figure 9:
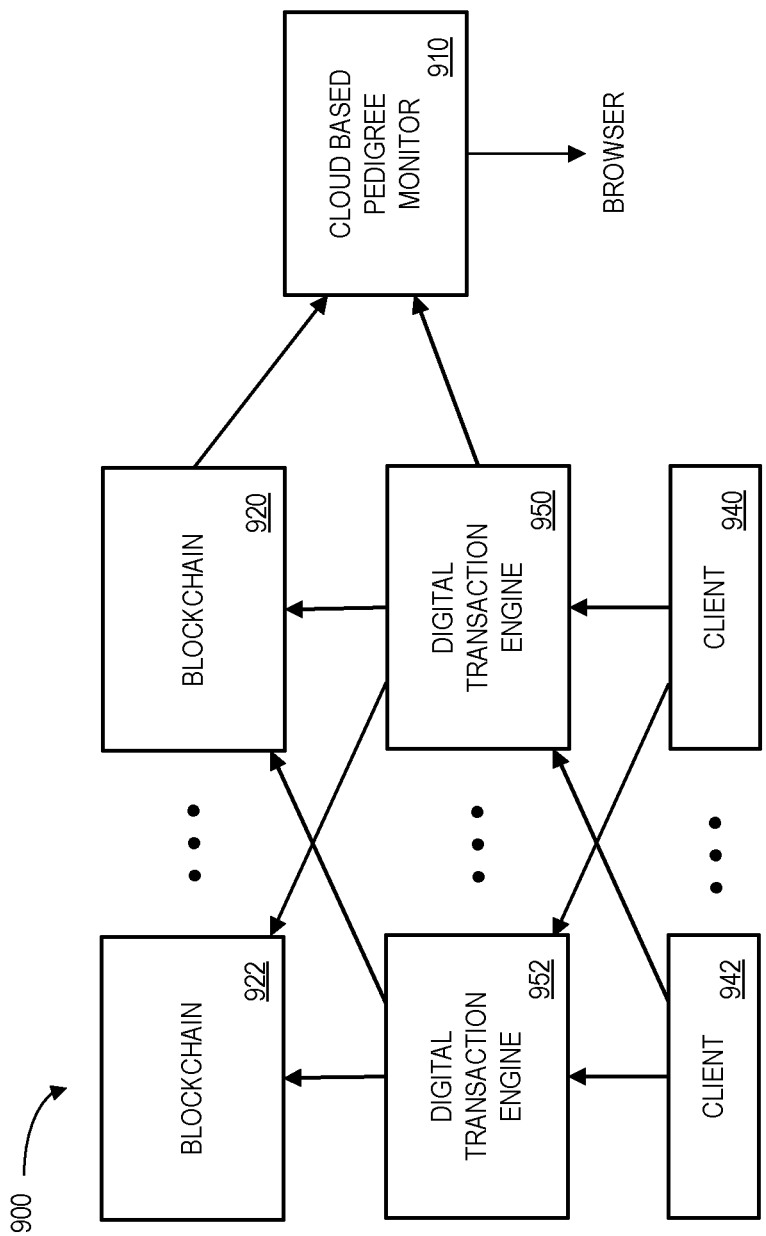
FIG. 9 is a system implementing a digital transaction with multiple digital transaction engines in accordance with some embodiments.

FIG. 8 is a system 800 implementing a digital transaction incorporating blockchain validation according to some embodiments. A cloud-based integrity monitor 810 may provide transaction integrity data via a web browser and exchange information with a blockchain 820 (or other secure distributed transaction ledger) and a digital transaction engine 850 via Representational State Transfer ("REST") web services or other similar web services. The REST web services may, for example, provide interoperability between computer systems on the Internet (e.g., by allowing requesting systems to access and manipulate textual representations of web resources using a uniform, predefined set of stateless operations). According to some embodiments, portions of the digital transaction engine 850 may be associated with database, such as a MySQL database. In this way, the digital transaction engine 850 and blockchain 820 can be used to provide transaction level verification for a client 840 (including, for example, information about one or more customized engineering models). Although FIG. 8 illustrates a system 800 with a single blockchain 820 and digital transaction engine 850, note that embodiments may employ other topologies. For example, FIG. 9 is a system 900 implementing a digital transaction incorporating multiple digital transaction engines in accordance with some embodiments. In particular, an additional blockchain 922 and digital transaction engine 952 may provide protection for an additional client 942. As illustrated in FIG. 9, each digital transaction engine 950, 952 may be associated with multiple blockchains 920, 922 providing additional protection for the system 900 (e.g., by storing information at multiple, geographically disperse nodes making attacks impractical). That is, each verifier (e.g., digital transaction engine 950, 952) may commit a brief summary to an independent data store (including for example, information about a customized engineering file) and, once recorded, the information cannot be changed without detection to provide a tamper-proof System of Records ("SoR").

Figure 10:
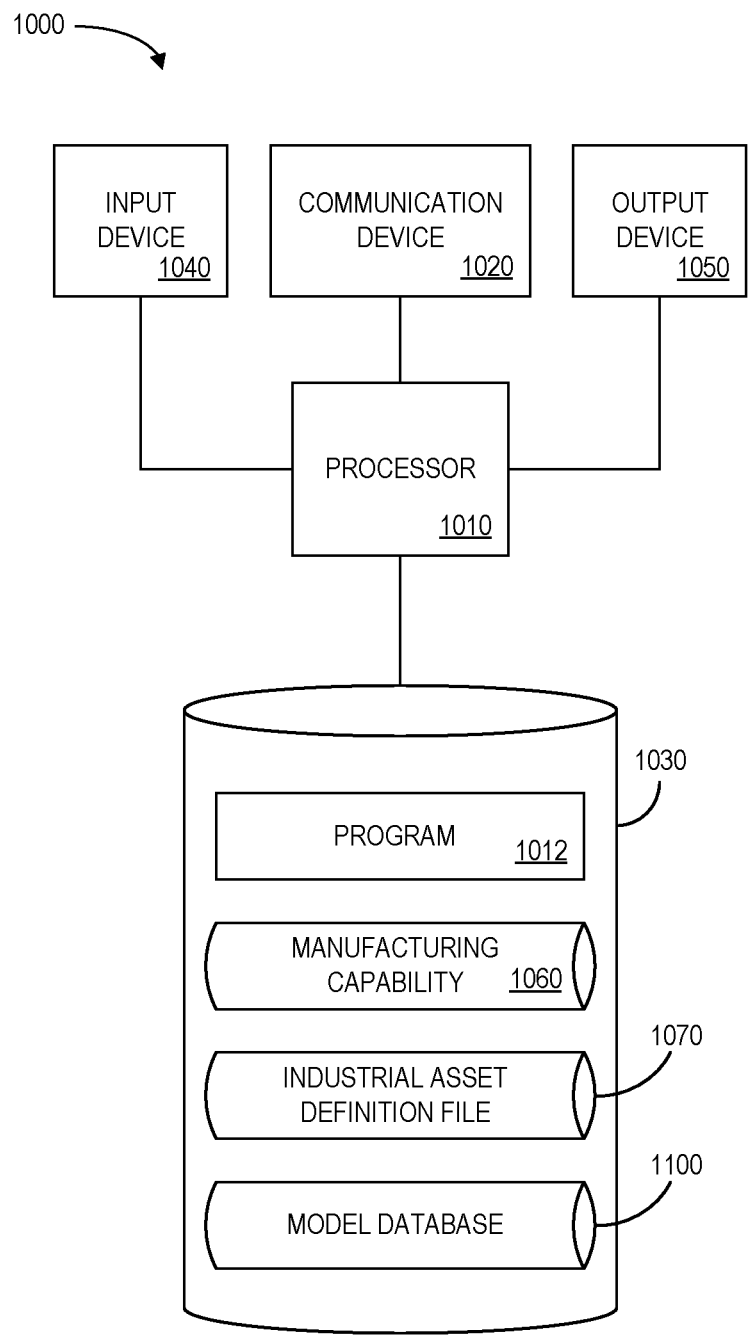
FIG. 10 illustrates a platform according to some embodiments.

Embodiments described herein may comprise a tool that facilitates creation of an industrial asset item and may be implemented using any number of different hardware configurations. For example, FIG. 10 illustrates a platform 1000 that may be, for example, associated with the systems 100, 500 of FIGS. 1 and 5, respectively (as well as other systems described herein). The platform 1000 comprises a processor 1010, such as one or more commercially available Central Processing Units ("CPUs") which may be in the form of one-chip microprocessors, coupled to a communication device 1020 configured to communicate via a communication network (not shown in FIG. 10). The communication device 1020 may be used to communicate, for example, with one or more remote additive manufacturing platforms or digital transaction engines. Note that communications exchanged via the communication device 1020 may utilize security features, such as those between a public internet user and an internal network of an insurance enterprise. The security features might be associated with, for example, web servers, firewalls, and/or PCI infrastructure. The platform 1000 further includes an input device 1040 (e.g., a mouse and/or keyboard to enter information about a customized engineering model, a distributed ledger, etc.) and an output device 1050 (e.g., to output pedigree reports including model identifiers, generate production status messages, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or network security service tool or application for controlling the processor 1010. The processor 1010 performs instructions of the program 1012, and thereby operates in accordance with any of the embodiments described herein. For example, the processor 1010 may receive additive manufacturing capability data from an additive manufacturing platform (e.g., a printer model number, a printer resolution, etc.). The processor 1010 may receive the additive manufacturing printer capability data and retrieve, from an additive manufacturing model data database, a primary engineering model associated with an industrial asset item. The processor 1010 may then create a customized version of the primary engineering model in accordance with the additive manufacturing printer capability data and the primary engineering model. The customized engineering model can then be transmitted to the additive manufacturing platform (e.g., to be printed to create the industrial asset item).

The program 1012 may be stored in a compressed, uncompiled and/or encrypted format. The program 1012 may furthermore include other program elements, such as an operating system, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as shown in FIG. 10), the storage device 1030 further stores manufacturing capability information 1060, industrial asset definition files 1070, and a model database 1100. An example of a database that might be used in connection with the platform 1000 will now be described in detail with respect to FIG. 11. Note that the database described herein is only an example, and additional and/or different information may be stored therein. Moreover, various databases might be split or combined in accordance with any of the embodiments described herein. For example, the model database 1100 and industrial asset definition files 1070 might be combined and/or linked to each other within the program 1012.

Figure 11:
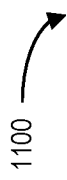
FIG. 11 is a portion of a tabular model database in accordance with some embodiments.

Referring to FIG. 11, a table is shown that represents the model database 1100 that may be stored at the platform 1000 in accordance with some embodiments. The table may include, for example, entries identifying models associated with the creation of items for customers. The table may also define fields 1102, 1104, 1106, 1108, 1110, 1112, 1114 for each of the entries. The fields 1102, 1104, 1106, 1108, 1110, 1112, 1114 may, according to some embodiments, specify: a model identifier 1102, an industrial asset item description 1104, a model type 1106, a parent model 1108, a blockchain result 1110, a printer identifier 1112, and a model definition file 1114. The transaction database 1100 may be created and updated, for example, based on information electrically received from remote additive manufacturer platforms, distributed ledger devices, etc.

The model identifier 1102 may be, for example, a unique alphanumeric code identifying a model that can be used by a three-dimensional printer to create an industrial asset item defined by the industrial asset item description 1104. The model type 1106 might indicate if the model is a "primary" model or a "customized" model and, in the case of customized models, the parent model 1108 might indicate which model was used to create the customized version. The blockchain result 1110 might indicate whether or not the information has been verified via a distributed ledger. The printer identifier 1112 might indicate which device is going to create (or has created) the industrial asset item, and the model definition file 1114 might contain a scan path, a CAD file, or link to a location where information defining the item is stored.

Figure 12:
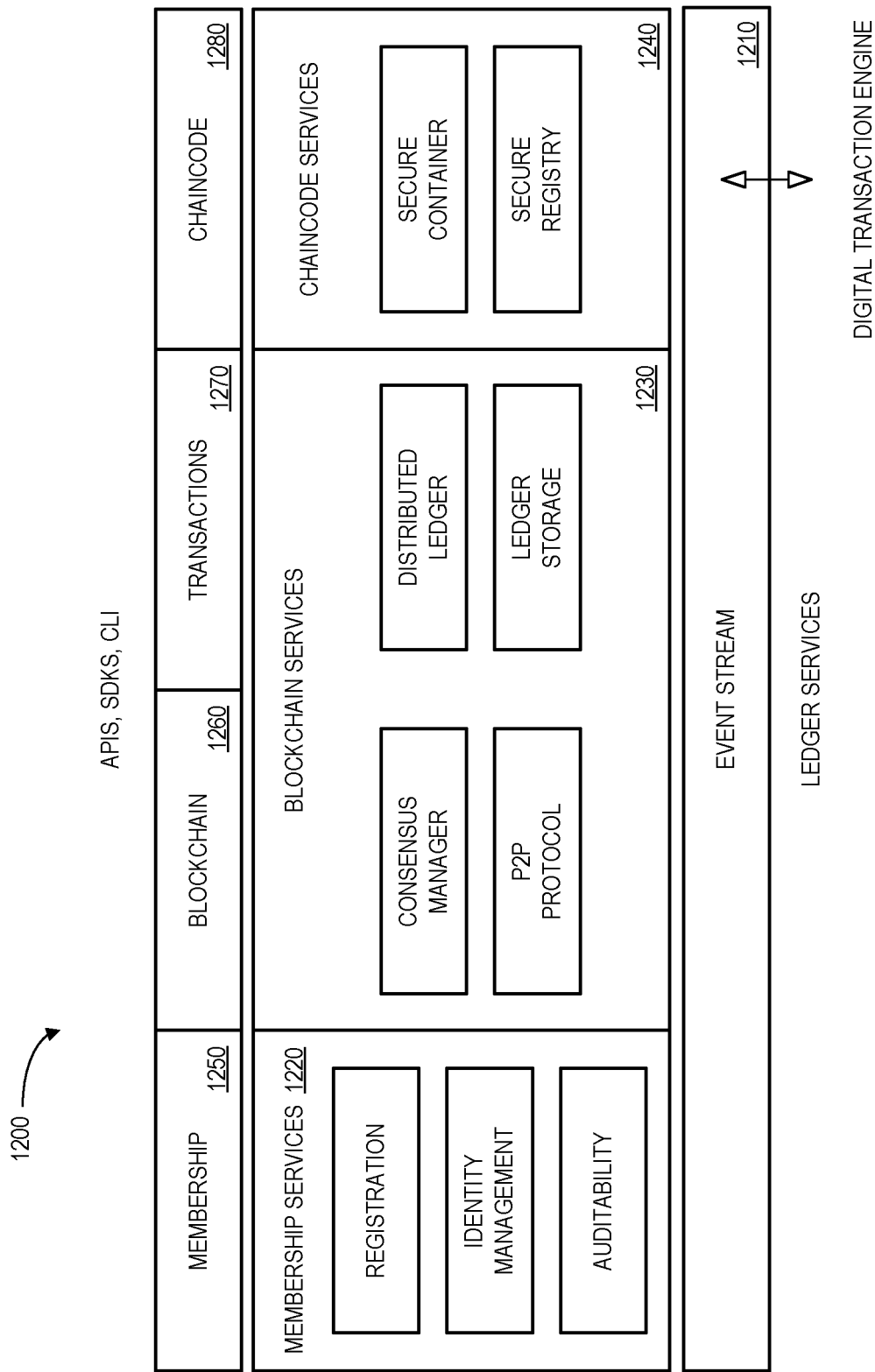
FIG. 12 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 12 is a distributed ledger reference architecture 1200 according to some embodiments. The architecture 1200 includes ledger services and an event stream 1210 that may contain network security service information (e.g., from a model customization platform). Membership services 1220 (e.g., including registration, identity managements, and/or an auditability process) may manage identity, privacy, and confidentiality for membership 1250 for the network security service. Blockchain services (e.g., including a consensus manager, Peer-to-Peer ("P2P") protocol, a distributed ledger, and/or ledger storage) may manage the distributed ledger, for example, through a P2P protocol to maintain a single state that replicated at many nodes to support blockchains 1260 and transactions 1270. Chaincode services 1240 (e.g., secure container and/or a secure registry associated with a smart contract) may help compartmentalize smart contract (or chaincode 1280) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service via the reference architecture 1200.

Thus, some embodiments described herein may help avoid the need to pre-create a substantial number of engineering models tailored to the most popular or commonly used computer controlled manufacturing hardware. Such an approach may be cost prohibitive as it would require the curation and storage of a large number of engineering model versions. In addition, some tailored engineering models may become out-of-date over time as new machinery and/or software is created.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
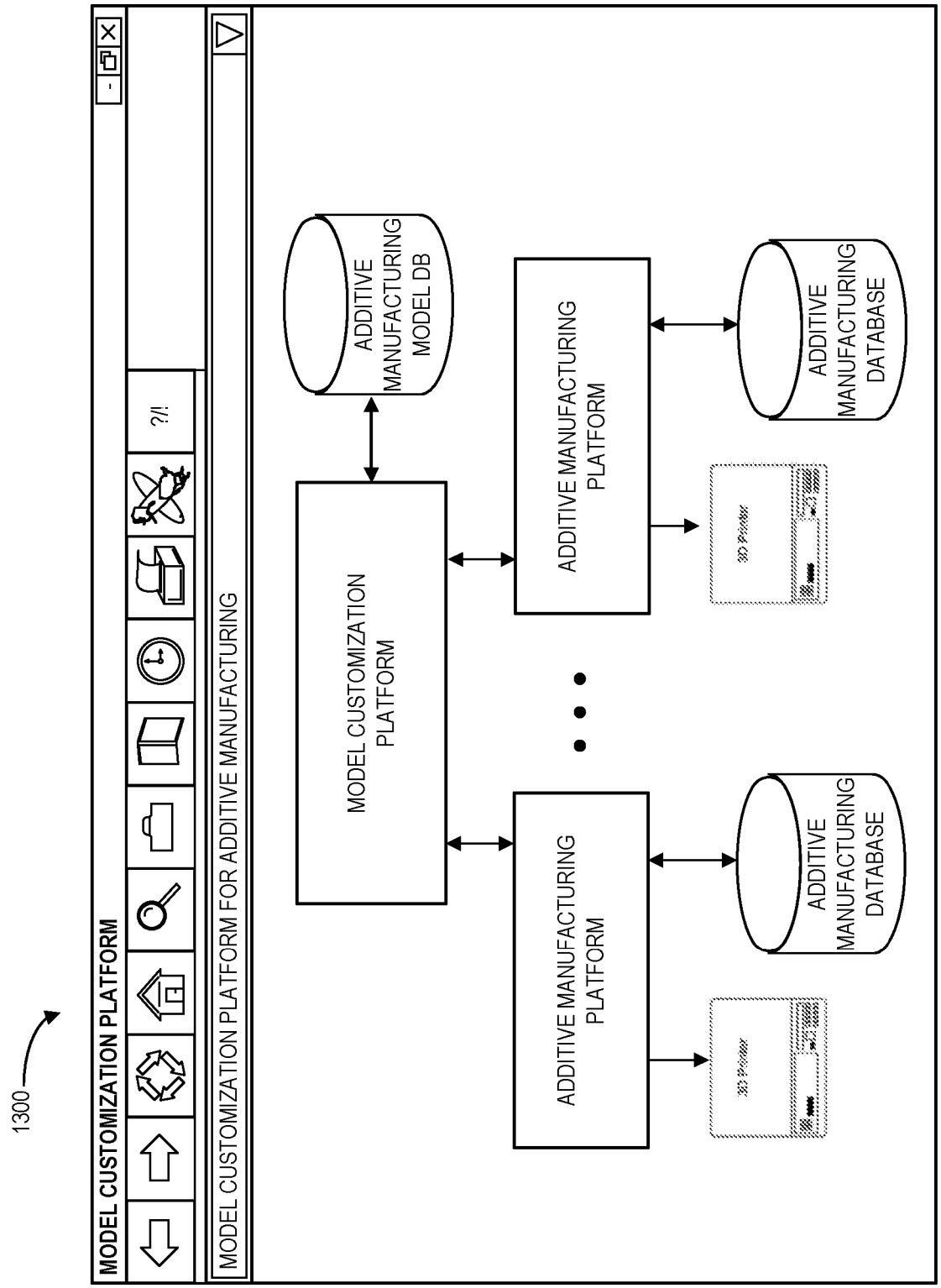
FIG. 13 illustrates a computer display in accordance with some embodiments.
Figure 14:
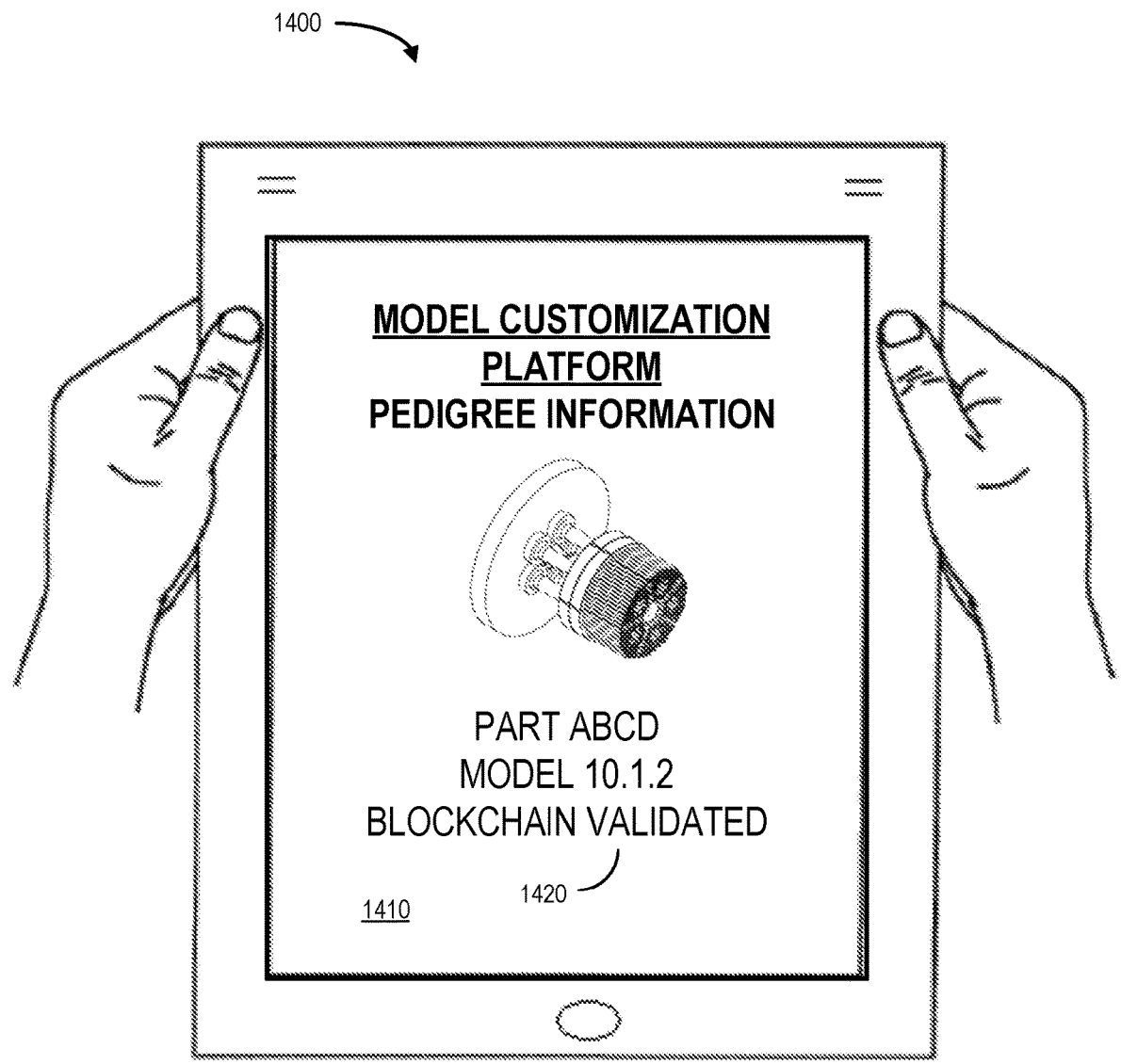
FIG. 14 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, although embodiments have been described with respect to industrial control systems, note that embodiments might be associated with other types of computing systems, including non-industrial control systems and processors in general. Similarly, the displays shown and described herein are provided only as examples, and other types of displays and display devices may support any of the embodiments. For example, FIG. 13 illustrates a model customization platform display 1300 that might utilize an interactive graphical user interface. The display 1300 might comprise a graphical overview of the devices associated with the item creation process and selection of an element on the display 1300 might result in further information about that element. As another example, FIG. 14 illustrates a tablet computer 1400 providing a pedigree information display 1410 according to some embodiments. In particular, the pedigree information display 1410 may be an interactive user interface (e.g., via a touchscreen) and includes a customized engineering model version number and a blockchain validation status 1420 in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of an industrial asset item, comprising:
    a model customization platform, comprising:
        an additive manufacturing model database storing electronic records comprising a primary engineering model associated with the industrial asset item;
        a communication port to exchange information with a plurality of additive manufacturing platforms; and
        a model customization platform computer processor, coupled to the additive manufacturing database and the communication port, adapted to:
            receive additive manufacturing printer capability data from the plurality of additive manufacturing platforms;
            retrieve the primary engineering model from the additive manufacturing model database;
            create a plurality of customized versions of the primary engineering model, wherein each customized version is created in accordance with respective additive manufacturing printer capability data associated with a corresponding additive manufacturing platform of the plurality of additive manufacturing platforms and the primary engineering model; and
            transmit the plurality of customized versions of the primary engineering model to a digital transition engine; and
    the digital transition engine communicatively coupled to the model customization platform and the plurality of additive manufacturing platforms, wherein the digital transition engine is configured to:
        receive a request for manufacturing the industrial asset item;
        receive the plurality of customized versions of the primary engineering model;
        select an additive manufacturing platform from the plurality of additive manufacturing platforms based on one or more parameters or characteristics associated with each of the plurality of additive manufacturing platforms with respect to one or more criteria associated with the industrial asset item; and
        assign the request to the selected additive manufacturing platform by transmitting one of the plurality of customized versions of the primary engineering model corresponding to the selected additive manufacturing platform to initiate a manufacturing process of the industrial asset item via an additive manufacturing printer.

2. The system of claim 1, wherein the additive manufacturing printer capability data is associated with at least one of: (i) an additive manufacturing printing technique, (ii) a printer manufacturer, (iii) a printer model, and (iv) a software version associated with a printer.

3. The system of claim 1, wherein the additive manufacturing printer capability data is associated with at least one of: (i) a resolution, (ii) a layer thickness, (iii) an X-Y resolution, (iv) a dots-per-square inch value, (v) a micrometer value, and (vi) a build envelope.

4. The system of claim 1, wherein the additive manufacturing printer capability data is associated with at least one of: (i) an electron beam power, and (ii) a laser power.

5. The system of claim 1, wherein the additive manufacturing printer capability data is associated with at least one of: (i) a raw material, and (ii) a powder characteristic.

6. The system of claim 1, wherein the additive manufacturing printer capability data is associated with at least one of: (i) a component capability, (ii) a laser type, (iii) a print nozzle type, (iv) a speed, and (v) a tolerance.

7. The system of claim 1, wherein the additive manufacturing printer capability data is associated with at least one of: (i) an environmental capability, (ii) a temperature, and (iii) a cleanliness value.

8. The system of claim 1, wherein the additive manufacturing printer capability data is associated with at least one of: (i) an inspection capability, and (ii) geographic information.

9. The system of claim 1, wherein at least one of the primary engineering model and the plurality of customized versions of the primary engineering model are associated with at least one of: (i) a scan path, (ii) a computer aided design file, (iii) an additive manufacturing file format, and (iv) a standard tessellation language file.

10. The system of claim 1, further comprising:
    the plurality of additive manufacturing platforms, each comprising:
        an additive manufacturing platform database storing electronic records comprising the additive manufacturing capability data;
        an additive manufacturing communication port to exchange information with the model customization platform, the model customization platform being remote from the additive manufacturing platform; and
        an additive manufacturing computer processor coupled to the additive manufacturing communication port and adapted to transmit an indication of the additive manufacturing capability data to the model customization platform.

11. The system of claim 10, wherein the plurality of additive manufacturing platforms, each further comprises:
    an additive manufacturing printer associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

12. The system of claim 1, further comprising:
    a customer platform, associated with a customer, to transmit the request for manufacturing the industrial asset item.

13. The system of claim 1, wherein the digital transition engine is further configured to
    record the assignment of the industrial asset item request via a secure, distributed transaction ledger.

14. The system of claim 13, wherein the secure, distributed transaction ledger comprises blockchain technology.

15. The system of claim 1, wherein the digital transaction engine communicates with the plurality of additive manufacturing platforms, at least some of which have differing additive manufacturing capability data, and a plurality of customer platforms requesting different industrial asset items.

16. The system of claim 1, wherein the model customization platform is associated with at least one of: (i) a single network cloud-hosted topology, (ii) a multiple network cloud-hosted topology, and (iii) a participant hosted intranet environment.

17. The system of claim 1, wherein the industrial asset item is associated with at least one of: (i) an engine, (ii) an aircraft, (iii) a dam, (iv) a locomotive, (v) power generation, and (vi) a wind turbine.

18. A computer-implemented method to facilitate creation of an industrial asset item, comprising:
 receiving, at a model customization platform from a plurality of additive manufacturing platforms, additive manufacturing printer capability data;
 retrieving, by the model customization platform from an additive manufacturing model data database, a primary engineering model associated with the industrial asset item;
 creating a plurality of customized versions of the primary engineering model, wherein each customized version is created in accordance with respective additive manufacturing printer capability data associated with a corresponding additive manufacturing platform of the plurality of additive manufacturing platforms and the primary engineering model; and
 transmitting the plurality of customized versions of the primary engineering model to a digital transition engine;
 receiving a request for manufacturing the industrial asset item;
 receiving the plurality of customized versions of the primary engineering model;
 selecting an additive manufacturing platform from the plurality of additive manufacturing platforms based on one or more parameters or characteristics associated with each of the plurality of additive manufacturing platforms with respect to one or more criteria associated with the industrial asset item; and
 assigning the request to the selected additive manufacturing platform by transmitting one of the plurality of customized versions of the primary engineering model corresponding to the selected additive manufacturing platform to initiate a manufacturing process of the industrial asset item via an additive manufacturing printer.

19. The method of claim 18, wherein the additive manufacturing capability data is associated with at least one of: (i) three-dimensional printing, (ii) vat photopolymerization, (iii) material jetting, (iv) binder jetting, (vi) material extrusion, (vii) powder bed fusion, (viii) sheet lamination, and (ix) directed energy deposition.

20. A non-transitory computer-readable medium storing program code, the program code executable by a processor of model customization platform to cause the platform to perform a method to facilitate creation of an industrial asset item, comprising:
 receiving, at a model customization platform from a plurality of additive manufacturing platforms, additive manufacturing printer capability data;
 retrieving, by the model customization platform from an additive manufacturing model data database, a primary engineering model associated with the industrial asset item;
 creating a plurality of customized versions of the primary engineering model, wherein each customized version is created in accordance with respective additive manufacturing printer capability data associated with a corresponding additive manufacturing platform of the plurality of additive manufacturing platforms and the primary engineering model; and
 transmitting the plurality of customized versions of the primary engineering model to a digital transition engine;
 receiving a request for manufacturing the industrial asset item;
 receiving the plurality of customized versions of the primary engineering model;
 selecting an additive manufacturing platform from the plurality of additive manufacturing platforms based on one or more parameters or characteristics associated with each of the plurality of additive manufacturing platforms with respect to one or more criteria associated with the industrial asset item; and
 assigning the request to the selected additive manufacturing platform by transmitting one of the plurality of customized versions of the primary engineering model corresponding to the selected additive manufacturing platform to initiate a manufacturing process of the industrial asset item via an additive manufacturing printer.

21. A system to facilitate creation of an industrial asset item, comprising:
 a model customization platform, comprising:
  a communication port for exchanging information with a plurality of additive manufacturing platforms; and
  a model customization platform computer processor coupled to the communication port and to an additive manufacturing model database, said database storing electronic records comprising a primary engineering model associated with the industrial asset item, the model customization platform computer processor adapted to:
   receive additive manufacturing printer capability data from the plurality of additive manufacturing platforms;
   retrieve the primary engineering model from the additive manufacturing model database;
   create a plurality of customized versions of the primary engineering model, wherein each customized version is created in accordance with respective additive manufacturing printer capability data associated with a corresponding additive manufacturing platform of the plurality of additive manufacturing platforms and the primary engineering model; and
   transmit the plurality of customized versions of the primary engineering model to the a digital transition engine; and
 the digital transition engine communicatively coupled to the model customization platform and the plurality of additive manufacturing platforms, wherein the digital transition engine is configured to:
  receive a request for manufacturing the industrial asset item;
  receive the plurality of customized versions of the primary engineering model;
  select an additive manufacturing platform from the plurality of additive manufacturing platforms based on one or more parameters or characteristics associated with each of the plurality of additive manufacturing platforms with respect to one or more criteria associated with the industrial asset item; and assign the request to the selected additive manufacturing platform by transmitting one of the plurality of customized versions of the primary engineering model corresponding to the selected additive manufacturing platform to initiate a manufacturing process of the industrial asset item via an additive manufacturing printer.

22. The system of claim 21, further comprising:

the additive manufacturing model database storing electronic records comprising a primary engineering model associated with the industrial asset item.

23. The system of claim 22, further comprising:

the plurality of additive manufacturing platforms, each comprising:

an additive manufacturing platform database storing electronic records comprising the additive manufacturing capability data, an additive manufacturing communication port to exchange information with the remote model customization platform, the model customization platform being remote from the plurality of additive manufacturing platforms, and an additive manufacturing computer processor coupled to the additive manufacturing communication port and adapted to transmit an indication of the additive manufacturing capability data to the model customization platform.

24. The system of claim 21, further comprising:

a customer platform, associated with a customer, to transmit the request for manufacturing the industrial asset item.

* * * * *